(12) United States Patent
Kawazoe et al.

(10) Patent No.: US 8,228,389 B2
(45) Date of Patent: Jul. 24, 2012

(54) IMAGE PICKUP APPARATUS, INTERCHANGEABLE LENS UNIT, CAMERA BODY, AND ULTRASONIC MOTOR DRIVING APPARATUS

(75) Inventors: Kenji Kawazoe, Hyogo (JP); Yasuhiro Shingu, Kyoto (JP); Norikazu Katsuyama, Osaka (JP); Hiroyuki Kawahara, Osaka (JP)

(73) Assignee: Panasonic Corporation, Osaka (JP)

( * ) Notice: Subject to any disclaimer, the term of this patent is extended or adjusted under 35 U.S.C. 154(b) by 702 days.

(21) Appl. No.: 12/338,216

(22) Filed: Dec. 18, 2008

(65) Prior Publication Data
US 2009/0167878 A1 Jul. 2, 2009

(30) Foreign Application Priority Data
Dec. 20, 2007 (JP) ................................. 2007-328674

(51) Int. Cl.
*H04N 5/225* (2006.01)
*H02N 2/00* (2006.01)
(52) U.S. Cl. ................................ 348/208.5; 310/323.03
(58) Field of Classification Search ............... 348/208.5, 348/340, 373, 351
See application file for complete search history.

(56) References Cited

U.S. PATENT DOCUMENTS

| | | | | |
|---|---|---|---|---|
| 4,853,578 A | * | 8/1989 | Takahashi et al. | 310/315 |
| 5,644,199 A | * | 7/1997 | Nojima et al. | 318/114 |
| 6,249,093 B1 | | 6/2001 | Takahata et al. | |
| 6,809,458 B2 | * | 10/2004 | Matsushita et al. | 310/316.01 |
| 6,894,422 B2 | * | 5/2005 | Kato | 310/323.03 |
| 7,830,103 B2 | * | 11/2010 | Hashimoto | 318/116 |
| 2006/0267526 A1 | * | 11/2006 | Nakajima | 318/116 |
| 2007/0279539 A1 | * | 12/2007 | Suzuki et al. | 349/1 |

FOREIGN PATENT DOCUMENTS

| | | | |
|---|---|---|---|
| JP | 11-356071 | | 12/1999 |
| JP | 2003-219668 | | 7/2003 |
| JP | 02004205742 | * | 7/2004 |
| JP | 2005-124296 | | 5/2005 |

* cited by examiner

*Primary Examiner* — Tuan Ho
*Assistant Examiner* — Shahbaz Nazrul
(74) *Attorney, Agent, or Firm* — Hamre, Schumann, Mueller & Larson, P.C.

(57) ABSTRACT

An image pickup apparatus of the present invention is an image pickup apparatus including an ultrasonic motor 35 that moves a focus lens 24, and further including a correction control part 100 that operates the ultrasonic motor 35 under a predetermined condition. The correction control part 100 is capable of executing a correction process by measuring a frequency characteristic of an applied voltage at the time of operating the ultrasonic motor 35 at a predetermined rotation speed, comparing the frequency characteristic with a preset reference frequency characteristic, and correcting the frequency characteristics on the basis of a difference between the frequency characteristic and the reference frequency characteristic so as to calculate a correction frequency characteristic. Accordingly, even when the frequency characteristic of the ultrasonic motor varies due to wear of the ultrasonic motor and mechanical components coupled thereto, a stable drive can be maintained over a long time.

17 Claims, 8 Drawing Sheets

IMAGE PICKUP APPARATUS, INTERCHANGEABLE LENS UNIT, CAMERA BODY, AND ULTRASONIC MOTOR DRIVING APPARATUS

BACKGROUND OF THE INVENTION

1. Field of the Invention

The present invention relates to an image pickup apparatus such as a digital still camera, with which a lens is integrated. The present invention relates also to a camera body to which an interchangeable lens unit can be attached detachably. The present invention relates also to an interchangeable lens unit that can be attached detachably to a camera body. Further, the present invention relates to an ultrasonic motor driving apparatus for driving and controlling an ultrasonic motor.

2. Description of Related Art

Recently, digital single-lens reflex cameras rapidly have come into widespread use. In an observation of a photographic subject by using an optical finder of such a digital single-lens reflex camera, a light beam entering an image pickup optical system is reflected by a mirror disposed on an optical path and guided to a finder optical system. As a result, a subject image is converted into an erected image through a pentaprism or the like and guided to the optical finder. Thereby, through the optical finder, a photographer can observe a subject image formed by the image pickup optical system. As mentioned above, a mirror typically is disposed on an optical path.

In a typical digital single-lens reflex camera, a focus lens and a focus motor are loaded in order to focus the subject image on an image pickup surface of an image pickup element. In general, the focus motor is provided as a DC motor.

However, it is difficult to move the focus lens precisely with the DC motor. Moreover, the DC motor may cause noise. In order to cope with this problem, Patent document 1 (JP H11-356071 A) discloses a configuration for loading an ultrasonic motor that has excellent precision in moving a focus lens and noise reduction.

There is unevenness among the ultrasonic motors in the frequency characteristic (i.e., a characteristic representing a relationship between a drive frequency inputted into an ultrasonic motor and an output rotation number (rotation speed) of the ultrasonic motor). For checking the frequency characteristic, according to the configurations as disclosed in Patent document 2 (JP 2003-219668 A) and Patent document 3 (JP 2005-124296 A), cameras are actuated under a specific condition so as to measure the frequency characteristic of every product, and the frequency characteristic is written on the memory in the interchangeable lens. At the time a user turns on the camera in use, the user reads the frequency characteristic written on the memory and controls the drive of the ultrasonic motor with reference to the frequency characteristic.

However, even though the frequency characteristic is measured at the time of factory shipment of the camera, after a long-time use of the camera by the user, the mechanical components such as gear and cam each coupled to the ultrasonic motor and/or the components inside the ultrasonic motor are worn and the frequency characteristic of the ultrasonic motor will vary. For this reason, it is impossible to maintain a stable drive for a long time with the setting of the frequency characteristic at the time of factory shipment.

SUMMARY OF THE INVENTION

Therefore, with the foregoing in mind, it is an object of the present invention to provide an image pickup apparatus, an interchangeable lens unit, a camera body and an ultrasonic motor driving apparatus, which can maintain a stable drive for a long time even when the frequency characteristics of the ultrasonic motor vary.

An image pickup apparatus of the present invention includes: a lens; an ultrasonic motor that moves the lens; a motor driving part that applies a periodically changing voltage to the ultrasonic motor, the voltage being applied for driving the ultrasonic motor; a storage part that stores as a reference frequency characteristic a relationship between a frequency of voltage applied by the motor driving part and a driving speed of the ultrasonic motor at the time of the voltage application; and a correction control part capable of executing a correction process. The correction process includes steps of: applying to the ultrasonic motor a specific or unspecific voltage by the motor driving part, measuring the relationship between the frequency of the applied voltage and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor at the time of the voltage application.

An interchangeable lens unit of the present invention includes: a lens; an ultrasonic motor that moves the lens; a motor driving part that applies a periodically changing voltage to the ultrasonic motor, the voltage being applied for driving the ultrasonic motor; a storage part that stores as a reference frequency characteristic a relationship between a frequency of voltage applied by the motor driving part and a driving speed of the ultrasonic motor at the time of the voltage application; and a correction control part capable of executing a correction process. The correction process includes steps of: applying to the ultrasonic motor a specific or unspecific voltage by the motor driving part, measuring the relationship between the frequency of the applied voltage and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor at the time of the voltage application.

A camera body of the present invention is a camera body to which an interchangeable lens unit is attached detachably, the interchangeable lens unit comprising an ultrasonic motor that moves a lens and a motor driving part that applies a periodically changing voltage to the ultrasonic motor via a communication member, the voltage being applied for driving the ultrasonic motor, the communication member allows a communication between the camera body and the interchangeable lens unit, the camera body comprising: a storage part that stores as a reference frequency characteristic a relationship between a frequency of voltage applied by the motor driving part and a driving speed of the ultrasonic motor at the time of the voltage application; and a correction control part capable of executing a correction process. The correction process includes steps of: applying to the ultrasonic motor a specific or unspecific voltage by the motor driving part, measuring the relationship between the frequency of the applied voltage and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor at the time of the voltage application.

An ultrasonic motor driving apparatus of the present invention includes: an ultrasonic motor; a motor driving part that applies a periodically changing voltage to the ultrasonic motor, the voltage being applied for driving the ultrasonic motor; a storage part that stores as a reference frequency characteristic a relationship between a frequency of voltage applied by the motor driving part and a driving speed of the ultrasonic motor at the time of the voltage application; and a correction control part capable of executing a correction process. The correction process includes steps of: applying to the ultrasonic motor a specific or unspecific voltage by the motor driving part, measuring the relationship between the frequency of the applied voltage and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor at the time of the voltage application.

According to the present invention, a stable drive is maintained for a long time even when a frequency characteristic of an ultrasonic motor varies due to wear of the ultrasonic motor and mechanical components coupled thereto.

DETAILED DESCRIPTION OF THE INVENTION

Figure 1:
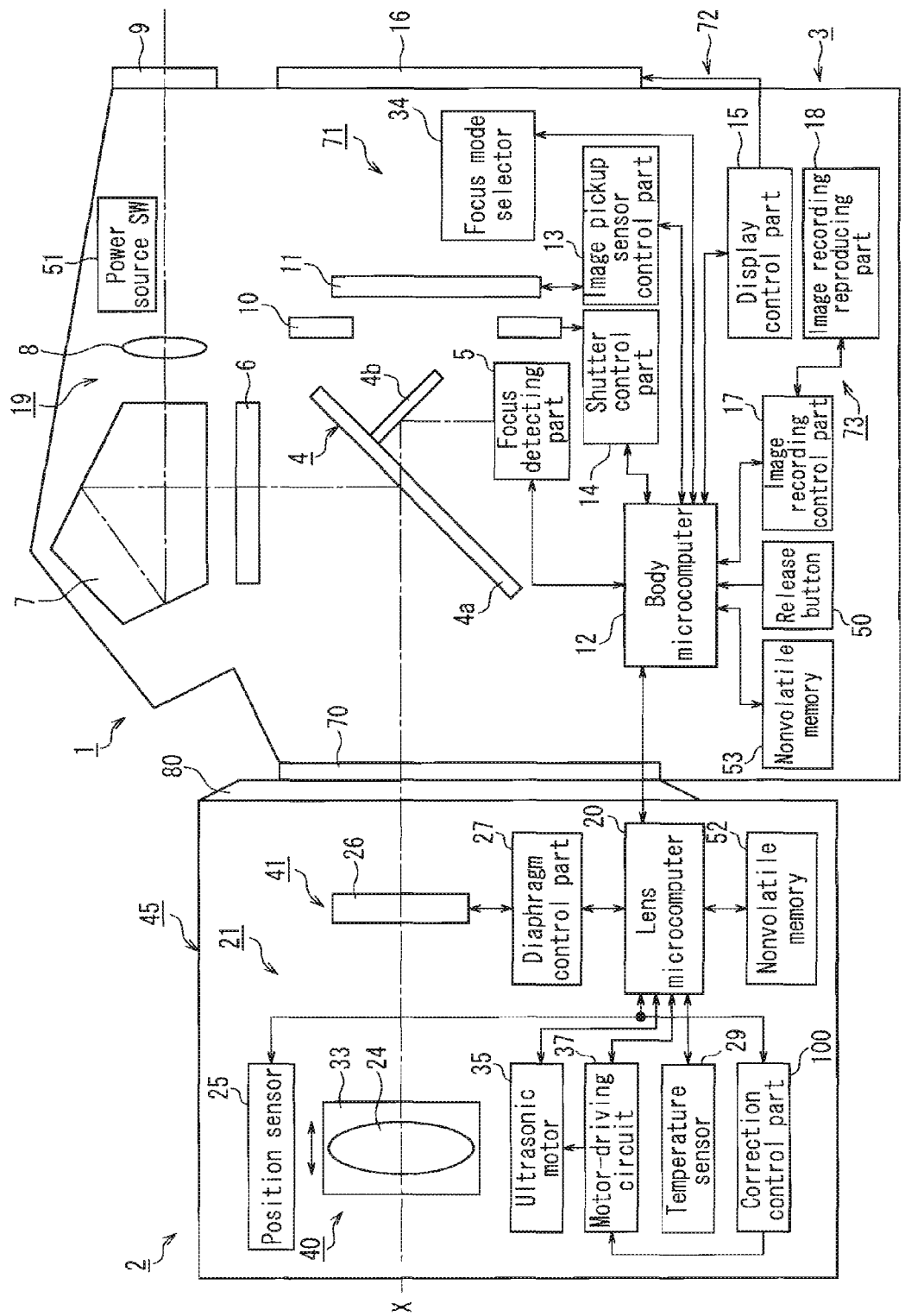
FIG. 1 is a block diagram showing a configuration of an image pickup apparatus according to an embodiment.

An image pickup apparatus of the present invention includes: a lens; an ultrasonic motor that moves the lens; a motor driving part that applies a periodically changing voltage to the ultrasonic motor, the voltage being applied for driving the ultrasonic motor; a storage part that stores as a reference frequency characteristic a relationship between a frequency of voltage applied by the motor driving part and a driving speed of the ultrasonic motor at the time of the voltage application; and a correction control part capable of executing a correction process. The correction process includes steps of: applying to the ultrasonic motor a specific or unspecific voltage by the motor driving part, measuring the relationship between the frequency of the applied voltage and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor at the time of the voltage application.

The aspects below can be applied to the image pickup apparatus of the present invention, based on the above configuration.

Namely, in the image pickup apparatus of the present invention, the correction control part can be configured to execute the correction process at the time of turning on the image pickup apparatus.

In the image pickup apparatus of the present invention, the correction control part can be configured to control the motor driving part so that during the correction process a specific or unspecific voltage is applied to the ultrasonic motor at the time of measuring the relationship between the frequency of the applied voltage and the driving speed of the ultrasonic motor, thereby the lens moving a round-trip within a predetermined range in an optical axis direction.

In the image pickup apparatus of the present invention, the correction control part can be configured to execute the correction process so as to measure the relationship between the frequency of the applied voltage and the driving speed of the ultrasonic motor during movement of the lens in a first direction, subsequently measures the relationship between the frequency of the applied voltage and the driving speed of the ultrasonic motor during movement of the lens in a second direction different from the first direction, and calculates the correction frequency characteristic by using a measurement result during the movement in the first direction and a measurement result during the movement in the second direction.

In the image pickup apparatus of the present invention, the correction control part can be configured to control the motor driving part so that the ultrasonic motor operates at a driving speed as a substantial median of an operable maximum driving speed and an operable minimum driving speed at the time of operating the ultrasonic motor in the correction process.

In the image pickup apparatus of the present invention, the ultrasonic motor can be configured to vary the driving speed periodically, and the correction control part controls the motor driving part so that the predetermined range corresponds to a distance for moving the lens for a time period corresponding to multiples of a period of the variation in the driving speed.

In the image pickup apparatus of the present invention, it is possible that a temperature detection part capable of detecting the environmental temperature of the ultrasonic motor is provided further, and that the correction control part is configured to adjust the correction frequency characteristic on the basis of a detection result from the temperature detection part at the time of measurement of the relationship between the frequency of the applied voltage and the driving speed of the ultrasonic motor.

In the image pickup apparatus of the present invention, the correction control part can be configured to adjust the correction frequency characteristic for every frequency of the applied voltage.

In the image pickup apparatus of the present invention, the motor driving part can be configured to determine a voltage to be applied to the ultrasonic motor on the basis of the correction frequency characteristic and apply the thus determined voltage to the ultrasonic motor.

In the image pickup apparatus of the present invention, the motor driving part can be configured to determine a voltage to be applied to the ultrasonic motor on the basis of the correction frequency characteristic and the detection result from the temperature detection part, and apply the thus determined voltage to the ultrasonic motor.

In the image pickup apparatus of the present invention, the temperature detection part can be configured to detect temperature at the time the ultrasonic motor drives the lens.

In the image pickup apparatus of the present invention, the temperature detection part can be configured to count the number of times that the ultrasonic motor drives the lens, and detect temperature once for a predetermined number of the drives.

In the image pickup apparatus of the present invention, the temperature detection part can be configured to detect the temperature at a predetermined time period.

(Embodiment)

Hereinafter, an embodiment for an image pickup apparatus of the present invention will be described. In this text, "forward" indicates a side of a camera body facing a photographic subject, which corresponds to the left side in FIG. 1 for example. "Backward" indicates a side of a camera body opposite to the photographic subject, namely, a side closer to an image pickup element rather than an image pickup optical system, and it corresponds to the right side in FIG. 1. "Upper" indicates a direction corresponding to the vertically upper part of a photographed image in a case where the longitudinal direction of the photographed image is kept horizontal, and it corresponds to the upper part in FIG. 1. In general, the upper side corresponds to the side where a release button is arranged on a camera body. And "lower" indicates a direction opposite to the upper side, and it corresponds to the lower part in FIG. 1. For the respective parts, the surfaces in the forward, backward, upper and lower sides are referred to as "the front face", "the back face", "the upper face" and "the lower face", respectively.

[1. Overall Configuration of Camera System]

FIG. 1 is a block diagram showing an overall configuration of a camera system 1.

As shown in FIG. 1, the camera system 1 is a system used for an interchangeable lens type digital single-lens reflex camera. The camera system 1 includes a camera body 3 and an interchangeable lens 2 attached detachably to the camera body 3. The interchangeable lens 2 is attached to a lens mount 70 provided at the front face of the camera body 3.

[1-1. Configuration of Camera Body]

The camera body 3 includes an image pickup part 71 that picks up an image of a photographic subject, a body microcomputer 12 (body control part) that controls operations of respective elements such as the image pickup part 71, an image display part 72 that can display a photographed image or various information, an image storage part 73 that can store image data, a finder optical system 19 for observing a photographic subject, and a nonvolatile memory 53.

The image pickup part 71 includes a quick-return mirror 4 that guides incident light to the finder optical system 19 and to a focus detecting part 5, an image pickup sensor 11 such as a CCD (Charge Coupled Device) image sensor that performs a photoelectric exchange, a shutter unit 10 that adjusts exposure time of the image pickup sensor 11, a shutter control part 14 that controls the drive of the shutter unit 10 with reference to a control signal from the body microcomputer 12, an image pickup sensor control part 13 that controls the operation of the image pickup sensor 11, and a focus mode selector 34.

The body microcomputer 12 controls various sequences. Specifically, the body microcomputer 12 is loaded with a CPU (Central Processing Unit), a ROM (Read-only Memory) and a RAM (Random Access Memory). The body microcomputer 12 can exhibit various functions as a result of a program stored in the ROM being read into the CPU. For example, the body microcomputer 12 has a function of detecting that the interchangeable lens 2 is attached to the camera body 3. As shown in FIG. 1, the body microcomputer 12 is configured such that it can communicate with the respective elements provided to the camera body 3.

The image display part 72 includes a liquid crystal monitor 16 and a display control part 15 that controls the operation of the liquid crystal monitor 16. The display element that displays images is not limited to the liquid crystal monitor 16 of the present embodiment, but it can be configured with any element such as an organic EL display as long as at least images can be displayed.

The image storage part 73 includes an image recording-reproducing part 18 that can record and reproduce image data of a photographed image on/from a card-type recording medium (not shown) for example, and an image-recording control part 17 that controls the operation of the image recording-reproducing part 18. The medium for recording image data is not limited to a card-type recording medium having a semiconductor memory as in the present embodiment, but a disc-type or tape-type recording medium can be used as well.

The quick-return mirror 4 includes a main mirror 4a and a sub-mirror 4b. The main mirror 4a can reflect and transmit incident light. The sub-mirror 4b is provided at the back face side of the main mirror 4a, and can reflect light transmitted through the main mirror 4a. The quick-return mirror 4 can be sprung up to a position outside the optical path X by a quick-return mirror control part (not shown). The incident light is split by the main mirror 4a into two fluxes of a reflected light flux and a transmitted light flux. The reflected light flux is guided to the finder optical system 19. The transmitted light flux is reflected by the sub-mirror 4b and used as a light flux for auto-focusing by a below-mentioned focus detecting part 5. In a normal photographing, the quick-return mirror 4 is sprung up to the position outside the optical path X by the quick-return mirror control part, and the shutter unit 10 is opened so that an image of the photographic subject is formed on the image pickup surface of the image pickup sensor 11. Except during the procedures of photographing, the quick-return mirror 4 is disposed on the optical path X as shown in FIG. 1, and the shutter unit 10 is kept in a closed state.

The finder optical system 19 includes a finder screen 6, a pentaprism 7, an ocular 8, and a finder ocular window 9. A subject image is formed on the finder screen 6. The pentaprism 7 converts the subject image to an erected image. The ocular 8 guides the erected image of the photographic subject to the finder ocular window 9. Through the finder ocular window 9, a photographer can observe the photographic subject.

A power source switch 51 is an operation part through which a user can turn on/off the power source of the camera system 1. When turned on by the user, the power source switch 51 controls a power source circuit (not shown) to feed power to the respective elements of the camera body 3 and of the interchangeable lens 2.

A release button 50 is an operation part that the user can operate at the time of focusing and releasing. The release button 50 can accept both a halfway depression and a full depression. Inside the release button 50, a first switch and a second switch are arranged. The first switch is turned on when the release button 50 is depressed halfway, and the second switch is turned on when the release button 50 is depressed fully. The body microcomputer 12 checks the halfway depression and the full depression through the control signal sent from the release button 50. For example, the body microcomputer 12 controls to perform a focusing operation when detecting a halfway depression of the release button 50, and to execute a photographing operation when detecting a full depression.

The nonvolatile memory 53 stores various kinds of information (body information) concerning the camera body 3. The body information includes information (body identification information) concerning a model for identifying the camera body 3, for example. The body identification information includes information, for example, name of manufacturer of the camera body 3, date of manufacture, model number, version of software installed in the body microcomputer 12, and information concerning firmware update. Alternatively, these pieces of information can be stored not in the nonvolatile memory 53 but in a memory part within the body microcomputer 12.

The focus mode selector 34 is an operation unit for selecting three kinds of modes of an auto-focus mode (AF mode), a manual focus mode (MF mode), and an auto-manual focus mode (AF+MF mode). The focus mode selector 34 is applied to the package of the camera body 3 in order to allow external operations.

[1-2. Configuration of Interchangeable Lens]

As shown in FIG. 1, the interchangeable lens 2 includes an image pickup optical system 21, a lens barrel 45, a focus adjusting part 40, a diaphragm adjusting part 41, a lens microcomputer 20, a nonvolatile memory 52, a temperature sensor 29 and a body mount 80. The image pickup optical system 21 can form an optical image of a photographic subject. The lens barrel 45 can support the image pickup optical system 21. The focus adjusting part 40 can perform a focusing. The diaphragm adjusting part 41 can adjust an aperture diaphragm. The lens microcomputer 20 (lens control part) can control the operation of the interchangeable lens 2. The temperature sensor 29 can detect the environmental temperature. The body mount 80 can be attached detachably to the lens mount 70.

The focus adjusting part 40 is a unit for adjusting the focal point of an optical image formed by the image pickup optical system 21. The focus adjusting part 40 includes an ultrasonic motor 35, a motor driving circuit 37 for driving the ultrasonic motor 35, and a position sensor 25.

The lens barrel 45 has a support frame 33 that holds the focus lens group 24 and other frame(s). The support frame 33 is driven rotationally by the ultrasonic motor 35. When the support frame 33 rotates with respect to the other frame, the support frame 33 is moved in a direction along the optical axis X by a cam groove (not shown) formed in the support frame 33 and also by a pin fixed to the other frame.

Figure 2:
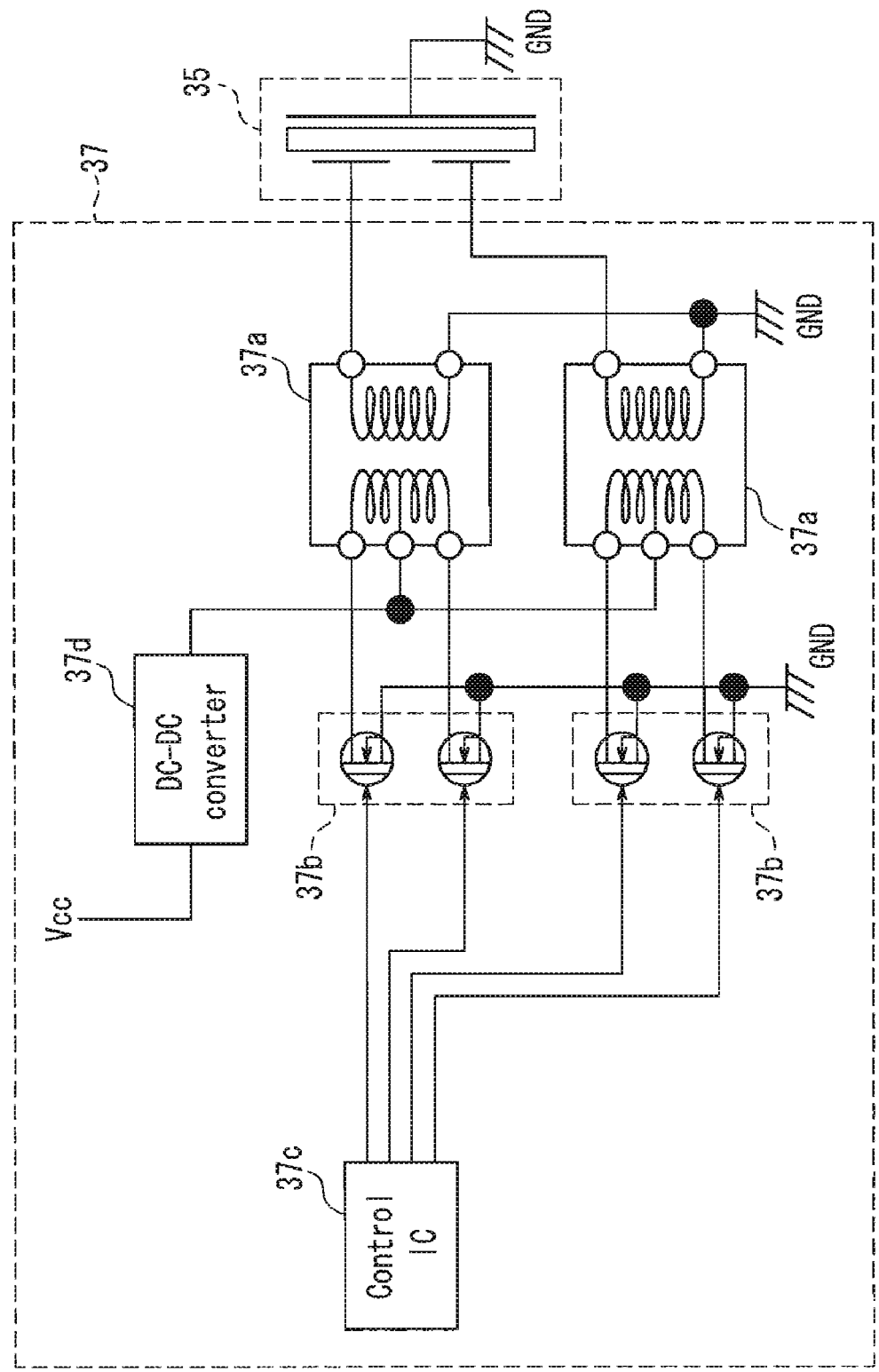
FIG. 2 is a block diagram showing a configuration of a motor driving circuit.

The ultrasonic motor 35 is a motor for driving the focus lens group 24 included in the image pickup optical system 21, and it can drive the support frame 33 rotationally. The ultrasonic motor 35 includes a piezoelectric element that oscillates when fed with a voltage. A comb-like stator (not shown) is arranged in the piezoelectric element. The piezoelectric element oscillates when being fed with a voltage, and this oscillation causes an elliptic oscillation of the stator. Thereby, a rotor (not shown) in frictional contact with the stator rotates to provide a rotational driving force. The rotational driving force of the rotor is transferred to the support frame 33 through the gear and a driving ring (not shown). The ultrasonic motor 35 is driven through the motor driving circuit 37. As shown in FIG. 2, for example, the motor driving circuit 37 includes a step-up transformer 37a, an FET (Field Effect Transistor) 37b, a control IC (Integrated Circuit) 37c, and a DC-DC converter 37d. Since the operation characteristics of the ultrasonic motor 35 will change depending on the environmental temperature, a temperature sensor 29 is provided for measuring the environmental temperature of the ultrasonic motor 35. The temperature sensor 29 is attached to or built in the motor driving circuit 37. In general, since the ultrasonic motor 35 is arranged in the vicinity of the motor driving circuit 37, the environmental temperature of the ultrasonic motor 35 and the temperature of the motor driving circuit 37 can be measured with the temperature sensor 29.

The position sensor 25 is a sensor for detecting the position of the focus lens group 24 in a direction along the optical axis X within the movable range, and a variable resistor or a magnetoresistive resistance effect element (MR sensor) is used for this purpose. The position sensor 25 can acquire positional information of the focus lens group 24 by using a voltage outputted with respect to the change in the resistance value.

The diaphragm adjusting part 41 includes a diaphragm part 26 that adjusts the aperture of the diaphragm and a diaphragm control part 27 that controls the operation of the diaphragm part 26.

The lens microcomputer 20 is connected to each element loaded in the interchangeable lens 2. Specifically, a CPU, a ROM and a RAM are loaded in the lens microcomputer 20, and various functions can be performed as a result that a program stored in the ROM is read into the CPU. Further, the body microcomputer 12 and the lens microcomputer 20 can be connected electrically to each other through electrical sections (not shown) provided respectively for the lens mount 70 and the body mount 80, thereby enabling information to be sent and received between them. The communications between the body microcomputer 12 and the lens microcomputer 20 can be optical communications, or the communications can be carried out through a radio wave.

The nonvolatile memory 52 stores various kinds of information Lens information) concerning the interchangeable lens 2. The lens information contains, for example, information concerning models for identifying the interchangeable lens 2 (lens identification information). The lens identification information includes, for example, the manufacturer of the interchangeable lens 2, date of manufacture, model number, and information concerning the version and firmware update of the software installed in the lens microcomputer 20. The lens identification information includes also information concerning whether the focus adjusting part 40 is compliant or not with the contrast detection scheme, for example. The nonvolatile memory 52 can store information sent from the body microcomputer 12. Alternatively, these pieces of information can be stored not in the nonvolatile memory 52 but in the memory part in the lens microcomputer 20.

[2. Drive Characteristics of Ultrasonic Motor]

Figure 3:
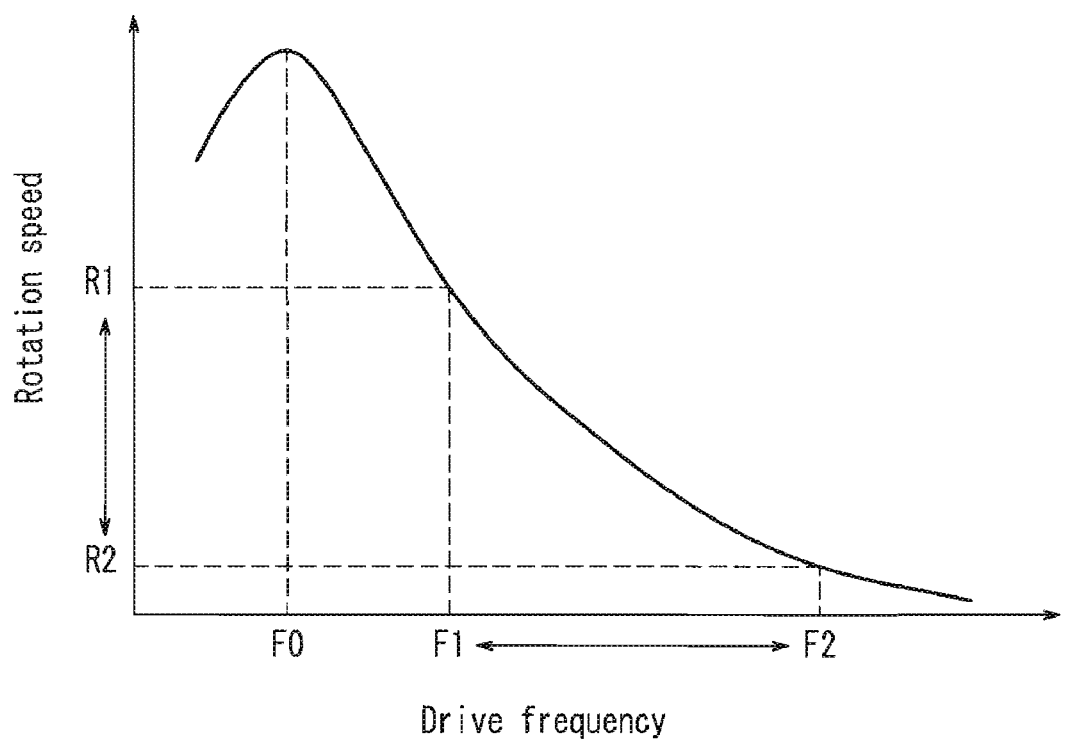
FIG. 3 is a diagram showing a drive frequency characteristic of an ultrasonic motor.

The driving speed of the ultrasonic motor 35 is controlled in general by varying the frequency, amplitude and phase difference of the drive voltage. FIG. 3 is a graph showing a relationship between the drive frequency (input) and the speed characteristics (output) of the ultrasonic motor 35 at the rated voltage V1.

When the rated voltage V1 is fed to the ultrasonic motor 35, as shown in FIG. 3, the rotation speed of the rotor is maximized at the resonance frequency F0, and the rotation speed is reduced as the drive frequency becomes higher than the resonance frequency F0. In a frequency range lower than the resonance frequency F0, the oscillation cannot be conveyed sufficiently to the rotor and the rotor rotates sliding with respect to the stator. This will result in the reduction in the rotation speed and the occurrence of unusual noise. Due to this reason, in a case of typical speed control (frequency control) with the drive frequency, a frequency in a region higher than the resonance frequency F0 is used. For example, when the ultrasonic motor 35 is driven in a drive frequency ranges F1-F2 in FIG. 3, the rotation speed of the rotor changes from R1 to R2 and the rotation speed of the motor is reduced as the drive frequency becomes higher. As mentioned above, the ultrasonic motor 35 can control the rotation speed (frequency control) by changing the drive frequency to be inputted.

[3. Calibration Process for Ultrasonic Motor]

The frequency characteristic of the ultrasonic motor 35 will vary after a long-time use, due to wear from the friction of the mechanical components such as gear and cam coupled with the ultrasonic motor 35 and the elements within the ultrasonic motor 35, and thus it is impossible to maintain the initial frequency characteristic. Therefore, in the present embodiment, the variation in the frequency characteristic is corrected by executing a correction process (calibration process) of the drive frequency of the ultrasonic motor 35 at the time of turning on the camera system 1. In FIG. 1, the correction control part 100 is a member that corrects the variation of the frequency characteristics caused by wear of the ultrasonic motor 35.

Figure 4:
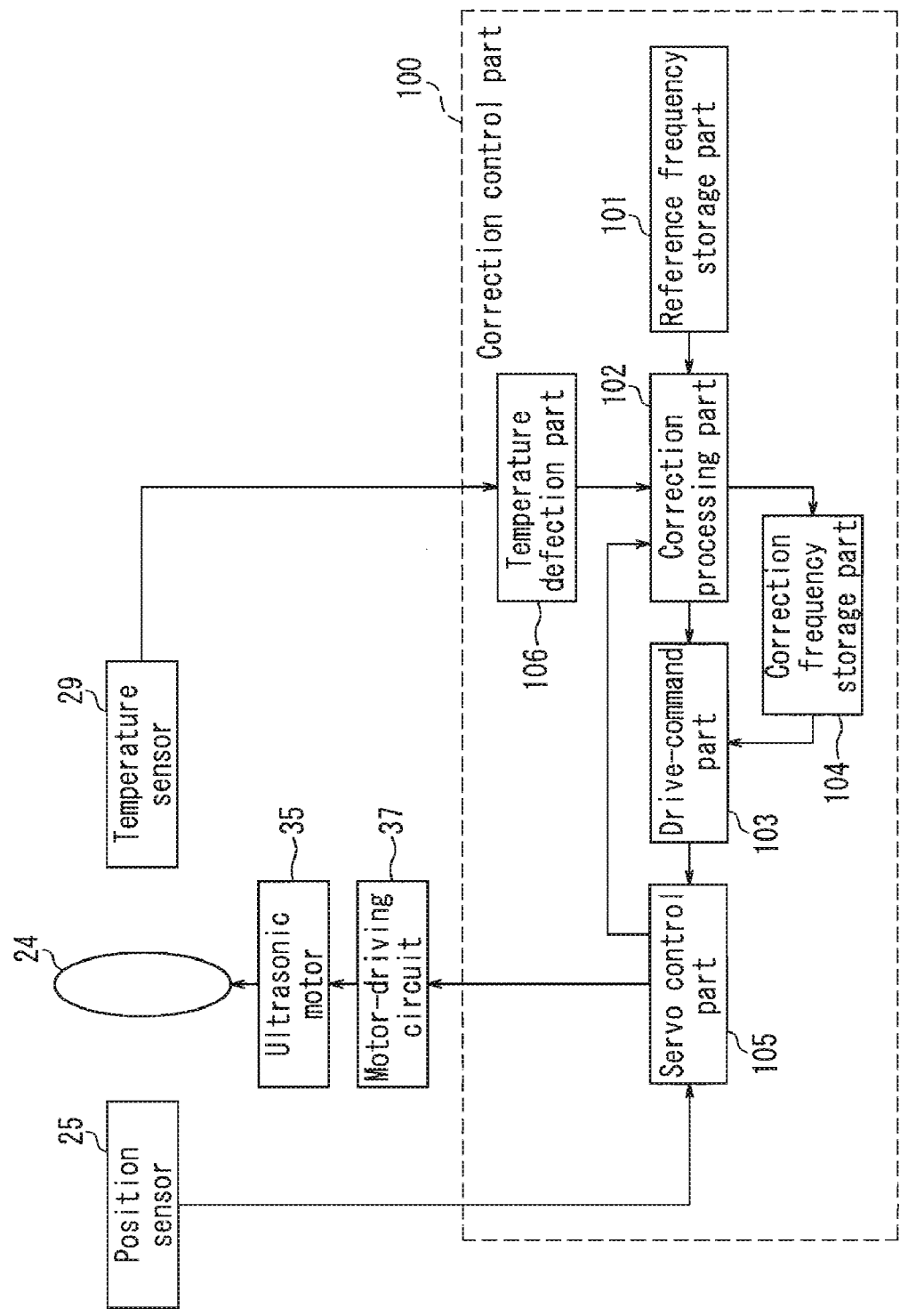
FIG. 4 is a block diagram showing a configuration of a correction control part and the peripheral devices.

FIG. 4 shows the correction control part 100 and the peripheral devices. The correction control part 100 includes a reference frequency storage part 101, a correction processing part 102, a drive-command part 103, a correction frequency storage part 104, a servo control part 105, and temperature detection part 106.

The reference frequency storage part 101 stores the initial drive frequency adjusted at the time of factory shipment, and it is formed of a nonvolatile memory such as a ROM for example. The correction processing part 102 calculates a correction value of the drive frequency from the drive frequency information or the temperature information acquired through the calibration process. The drive-command part 103 outputs to the servo control part 105 the condition for driving the ultrasonic motor 35, which is executed in the calibration process. The correction frequency storage part 104 stores the correction value of the drive frequency calculated in the calibration process, and it is formed of a backup memory such as a RAM for example. The servo control part 105 performs a control such that the ultrasonic motor 35 executes the predetermined operation in accordance with the drive condition provided by the drive-command part 103. For example, in a speed control, the servo control part 105 adjusts the drive frequency on the basis of the speed information from the position sensor 25 so that the ultrasonic motor 35 reaches the target speed. The temperature detection part 106 calculates temperature from information detected by the temperature sensor 29. For example, when a resistance bulb such as a thermister is used for the temperature sensor 29, the temperature detection part 106 detects the resistance value of the temperature sensor 29 and converts the resistance value to temperature information.

Figure 5:
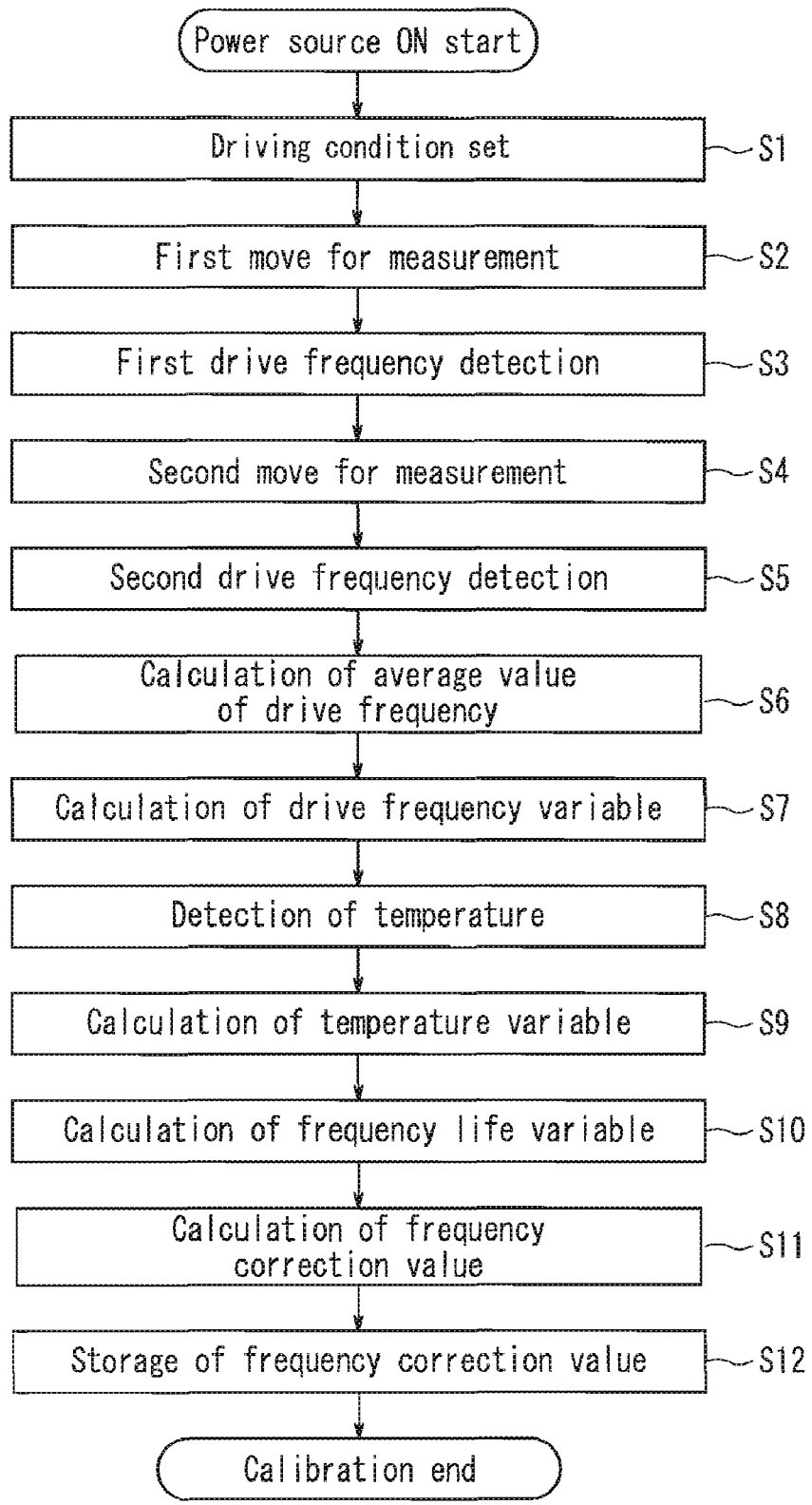
FIG. 5 is a flow chart showing a calibration process.

FIG. 5 shows a flow of a calibration process of the ultrasonic motor 35 in the present embodiment. First, when the power source switch 51 (see FIG. 1) is operated to turn on the camera system 1, the body microcomputer 12 controls to activate the respective elements of the camera body 3 and at the same time, controls the lens microcomputer 20 so as to activate the respective elements of the interchangeable lens 2. Based on the activation instruction from the body microcomputer 12, the lens microcomputer 20 controls to activate the respective elements and instructs the correction control part 100 to start the calibration process. The correction control part 100 starts the calibration process in accordance with the instruction from the lens microcomputer 20.

Next, the drive-command part 103 outputs the set drive condition to the servo control part 105. The servo control part 105 instructs the motor driving circuit 37 to drive the ultrasonic motor 35 with reference to the drive condition sent from the drive-command part 103 (S1).

Here, "drive condition" includes information of the drive direction, the drive speed and the drive amount of the ultrasonic motor 35.

"Drive direction" denotes a displacement direction of the ultrasonic motor 35 at the time that the ultrasonic motor 35 drives a load. For example, in a case of a rotational ultrasonic motor, "drive direction" indicates a direction that the ultrasonic motor 35 rotates. According to the present embodiment, in a calibration process, the ultrasonic motor 35 is rotated in a first direction and subsequently rotated in a second direction opposing the first direction, thereby the focus lens 24 moves a round-trip within the movable range. The direction that the load (the focus lens 24 in this embodiment) moves at the time of rotating the ultrasonic motor 35 is called a "move pattern". When the number of switching the rotational direction of the ultrasonic motor 35 is increased to increase the number of the round-trip movement of the focus lens 24, more data of the drive frequency can be acquired and thus a more precise average value (described below) can be calculated. However, since this inevitably increases the time required for the calibration process, a preferred number of the round-trip movement is one or not much greater than one.

"Drive speed" indicates a displacement speed of the ultrasonic motor 35 at the time that the ultrasonic motor 35 drives the load. For example, in a case of a rotational ultrasonic motor, the "drive speed" indicates the rotation speed of the ultrasonic motor 35. Even for a case of a rotational ultrasonic motor, the move speed of the load can be defined as the "drive speed" instead of defining the rotation speed of the ultrasonic motor as the "drive speed". The speed at which the load (the focus lens 24 in the present embodiment) moves at the time of operating the ultrasonic motor 35 is called "move speed". According to the present embodiment, in the calibration process, the ultrasonic motor 35 is rotated at a rotation speed (for example, 200 rpm) as a substantial median of the maximum rotation speed and the minimum rotation speed of the ultrasonic motor 35, thereby moving the focus lens 24 at a move speed as a substantial median of the maximum rotation speed and the minimum rotation speed. In the explanation below, the rotation speed of the ultrasonic motor 35 as a substantial median of the maximum rotation speed and the minimum rotation speed is called "median rotation speed" and the move speed of the focus lens 24 at that time is called "median move speed". Though the rotation speed of the ultrasonic motor 35 is set to the substantial median of the maximum rotation speed and the minimum rotation speed in the present embodiment, the speed is not restricted to this example. Any desired rotation speed can be employed as long as the rotation speed is within a range between the maximum rotation speed and the minimum rotation speed.

"Drive amount" denotes a displacement amount of the ultrasonic motor 35 at the time that the ultrasonic motor 35 drives the load. For example, in a case of a rotational ultrasonic motor, "drive amount" indicates a rotation amount of the ultrasonic motor 35. Even for such a rotational ultrasonic motor, the move distance of the load can be defined as the drive amount instead of defining the rotation amount of the ultrasonic motor as the drive amount. "Move distance" denotes a distance that the load (the focus lens 24 in the present embodiment) moves at the time of rotating the ultrasonic motor 35.

Figure 6:
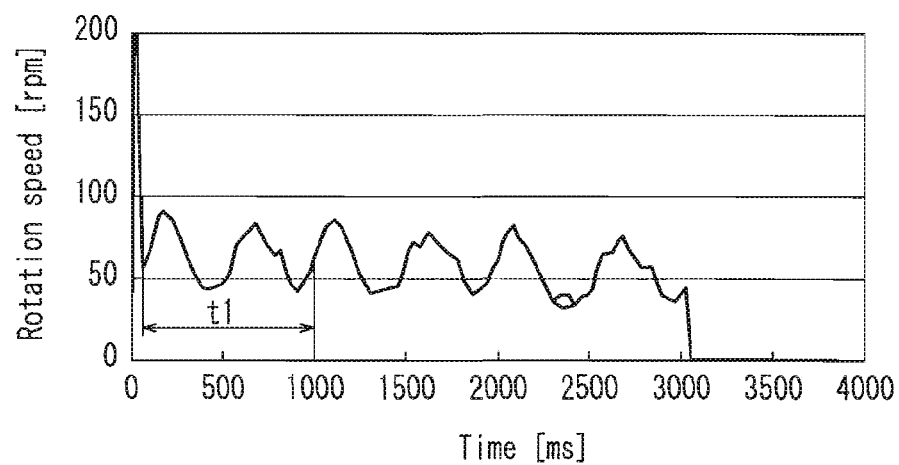
FIG. 6 is a diagram showing a fluctuation in the rotation speed of an ultrasonic motor.

FIG. 6 shows an example of a change over time in the rotation speed when the ultrasonic motor is applied with a voltage of constant frequency. As shown in FIG. 6, the rotation speed of the ultrasonic motor often varies (rotation unevenness) due to the influence of loads coupled thereto. According to the present embodiment, in the calibration process, the rotation amount of the ultrasonic motor 35 is controlled so that the move distance of the focus lens 24 corresponds to two periods of the rotation unevenness of the ultrasonic motor 35 as shown as the time 't1' in FIG. 6.

By increasing the rotation amount of the ultrasonic motor 35 and increasing the move distance of the focus lens 24, it would be possible to acquire an average value (below stated) from which the influence of the rotation unevenness is excluded more precisely. However, since this will increase the time required for the calibration process, the time corresponding more or less to two periods of the rotation unevenness is preferred.

Next, the ultrasonic motor 35 starts the operation of rotation according to the instruction from the motor driving circuit 37. The servo control part 105 controls the motor driving circuit 37 to rotate the ultrasonic motor 35 for two periods of the rotation unevenness in the first direction at a median rotation speed. The ultrasonic motor 35 rotates with reference to the voltage applied from the motor driving circuit 37, thereby moving the focus lens 24 for two periods of the rotation unevenness at the median move speed in the first direction (the first half) (S2).

Next, the servo control part 105 detects the drive frequency of the ultrasonic motor 35. In the present embodiment, the servo control part 105 carries out a speed control (feedback control) for rotating the ultrasonic motor 35 at the median rotation speed and measures the drive frequency at the time of reaching the median rotation speed (input to the ultrasonic motor 35). The thus measured drive frequency is determined as a first drive frequency (S3).

Next, the servo control part 105 controls the motor driving circuit 37 to rotate the ultrasonic motor 35 at a median rotation speed for two periods of the rotation unevenness in the second direction. The ultrasonic motor 35 starts a rotational operation in the reverse direction to the above-mentioned step S2, in accordance with the voltage applied by the motor driving circuit 37, and moves the focus lens 24 for two periods of the rotation unevenness at the median move speed in a second direction (latter half) (S4).

Next, the servo control part 105 detects the drive frequency of the ultrasonic motor 35. In the present embodiment, the servo control part 105 controls the speed for rotating the ultrasonic motor 35 at the median rotation speed and measures the drive frequency at the time reaching the median rotation speed. The drive frequency measured at that time is set as a second drive frequency (S5).

Next, the servo control part 105 sends the information of the thus measured first drive frequency and second drive frequency to the correction processing part 102. The correction processing part 102 calculates the average value of the first drive frequency and the second drive frequency (S6).

This process of calculating the average value is performed to avoid the influence imposed on the drive frequency by the orientation of the camera system 1. In other words, when the camera system 1 is in an orientation with its lens optical axis in a horizontal state, the loads applied to the ultrasonic motor 35 are substantially unchanged in a comparison between the first half and the second half in the round-trip movement of the focus lens 24, and thus the first drive frequency and the second drive frequency will have substantially the same values.

On the contrary, when the camera system 1 is in an orientation with its lens optical axis in a vertical state (a state where the front face of the camera system 1 is faced upward or downward), or with its lens optical axis inclined with respect to the horizontal state, the load applied to the ultrasonic motor 35 in the first halfway of the focus lens 24 is different from the load applied in the second halfway.

For example, when the front face of the camera system 1 faces upward, the load applied to the ultrasonic motor 35, which is caused by the weights of the focus lens 24 and the peripheral mechanical components, is increased during the forward movement of the focus lens 24. During the backward movement of the focus lens 24, the load applied to the ultrasonic motor 35, which is caused by the weights of the focus lens 24 and the peripheral mechanical components, is decreased. As a result, the first drive frequency and the second drive frequency will have values different from each other.

In the present embodiment, the average value of the first drive frequency and the second frequency is calculated for canceling the difference between the first drive frequency and the second frequency, which resulted from the orientation of the camera system 1.

Next, the correction processing part 102 calculates a drive frequency variable (S7) by performing a differential process on the average value calculated in the step S6 and the reference frequency that has been read out from the reference frequency storage part 101. In the present embodiment, the reference frequency storage part 101 is formed of a ROM capable of reading data of the reference frequency.

Next, the temperature detection part 106 acquires temperature information detected at the temperature sensor 29. The thus acquired temperature information is sent to the correction processing part 102 (S8).

Next, the correction processing part 102 calculates the temperature variable on the basis of the temperature information sent from the temperature detection part 106 (S9).

As the operation characteristics of the ultrasonic motor 35 changes depending on the environmental temperature, the temperature sensor 29 is arranged for measuring the environmental temperature of the ultrasonic motor 35.

Figure 7:
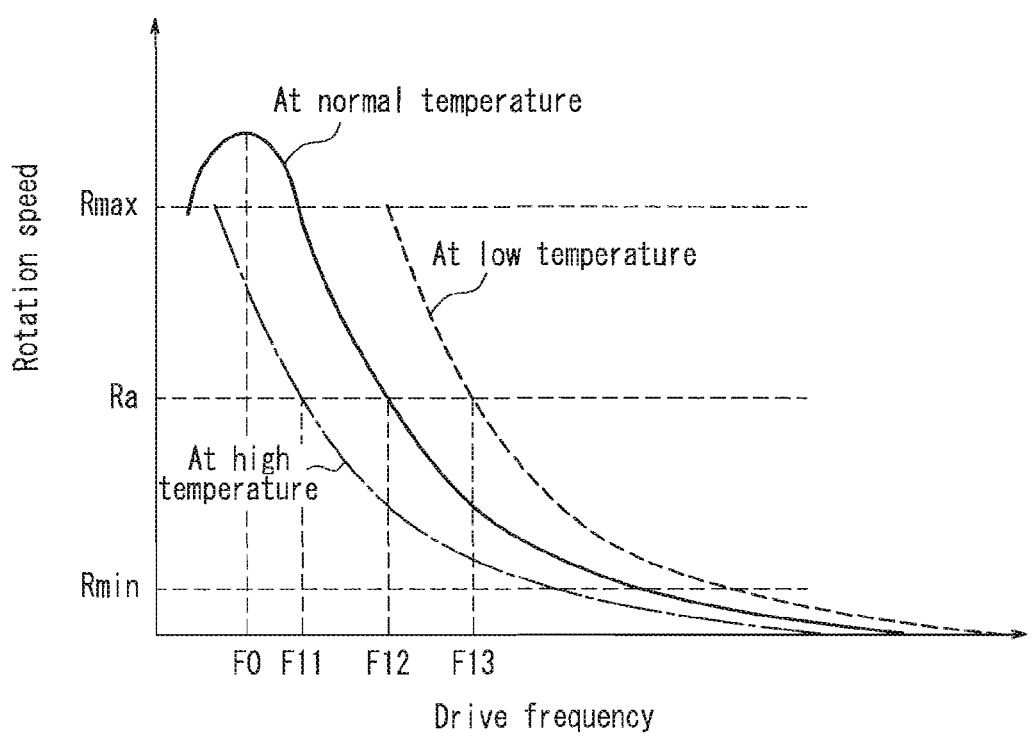
FIG. 7 is a diagram showing a drive frequency characteristic of an ultrasonic motor with respect to a change in the environmental temperature.

FIG. 7 shows the frequency characteristic of the ultrasonic motor 35 with respect to the change in the environmental temperature. As shown in FIG. 7, when the environmental temperature becomes higher than the reference temperature (for example, normal temperature), the resonant frequency F0 of the ultrasonic motor 35 shifts to the low frequency side, and the curve of the frequency characteristics also shifts to the low frequency side. When the environmental temperature becomes lower than the normal temperature, the resonant frequency shifts to the high frequency side, and as a result, the curve of the frequency characteristics also shifts to the high frequency side. Therefore, for driving the ultrasonic motor 35 to rotate at a rotation speed Ra as a median between the maximum rotation speed Rmax and the minimum rotation speed Rmin, it is required to apply a voltage of drive frequency F11 when the environmental temperature is high, and to apply a voltage of drive frequency F13 that is higher than the drive frequency F11 when the environmental temperature is low.

Next, the correction processing part 102 subtracts the temperature variable, which has been calculated in the step S9, from the drive frequency variable calculated in the step S7, thereby calculating a life variable (S10). That is, the drive frequency variable consists of the temperature variable and the life variable. The life variable indicates a variation in the drive frequency caused by wear or the like of the ultrasonic motor 35 and the driving mechanisms of the focus lens 24.

Next, the correction processing part 102 calculates the frequency correction value (S11) on the basis of the life variable calculated in the step S10. The frequency correction value corresponds to the control to the ultrasonic motor 35.

Figure 8:
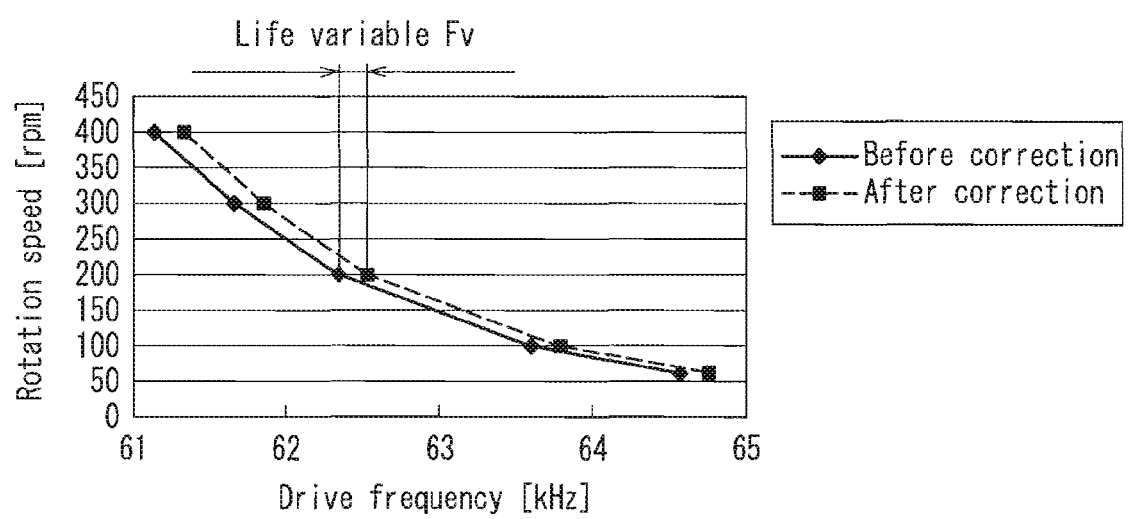
FIG. 8 is a diagram showing a corrected frequency characteristic of an ultrasonic motor.

FIG. 8 shows characteristics of the drive frequency before correction (reference frequency characteristics) and after correction frequency correction values) with reference to the life variable. As shown in FIG. 8, in the present embodiment, the ultrasonic motor 35 is rotated at 200 rpm for measurement of the drive frequency and thus calculating the life variable Fv, and the thus calculated life variable Fv is reflected also on the other rotation speed regions (60, 100, 300 and 400 rpm in FIG. 8). Namely, frequency correction values corrected with a uniform life variable Fv across the rotation speed regions are calculated.

Next, the correction processing part 102 writes the thus calculated frequency correction values in the correction frequency storage part 104 (S12). In the present embodiment, the correction frequency storage part 104 is formed of a RAM that can write and read data of the frequency correction values.

In this manner, the calibration process of the ultrasonic motor 35 is completed. The calibration process is executed every time the camera system 1 is turned on.

[4. Effect of the Embodiment, and the Others]

According to the present embodiment, a calibration process is carried out by driving the ultrasonic motor 35 under a predetermined condition so as to measure the frequency characteristics, calculating a variable in comparison with reference frequency characteristics, and by correcting the frequency characteristics on the basis of the calculated variable. Thus, the difference of the frequency characteristics among the ultrasonic motors 35 can be corrected. Therefore, even when the ultrasonic motor 35 and the mechanical components such as gear and cam coupled thereto are worn, a precise control at the ultrasonic motor 35 can be maintained.

Moreover, since the variable can be detected by having the focus lens 24 move just a round-trip within a predetermined range during the calibration process, the calibration process can be finished in a short time, and the time required for activating the camera system 1 can be shortened.

Moreover, since the calibration process of the present embodiment is executed every time the camera system 1 is turned on, there is no necessity of storing the measurement data of the drive frequency, which has been measured separately, in a memory such as a flash ROM. Therefore, a memory will not be required, and a simple configuration can be provided. This can reduce the cost and serve to provide a smaller camera system 1.

During the calibration process, the temperature variable based on the environmental temperature of the ultrasonic motor 35 (calculated in the step S8 in FIG. 5) is subtracted from the drive frequency variable (calculated in the step S7 in FIG. 5) so as to obtain the life variable alone (the step S10 in FIG. 5), and a correction value is calculated based on the life variable so as to correct the drive frequency of the ultrasonic motor 35, and thus the precise control in the ultrasonic motor 35 can be maintained. That is, by correcting the drive frequency of the ultrasonic motor 35 in the aforementioned manner, influences of the environmental temperature can be avoided during the calibration process and thus, the change in the drive frequency over time can be detected accurately. Therefore, the life variable can be calculated accurately, and the precise control at the ultrasonic motor 35 can be maintained. Here, the correction value of the drive frequency based on the temperature variable is called "temperature correction value" and the correction value of the drive frequency based on the life variable is called "life correction value".

It should be noted that the correction value (correction frequency characteristics) of the drive frequency in the actual calibration process corresponds to the sum of the temperature correction value and the life correction value.

Figure 9:
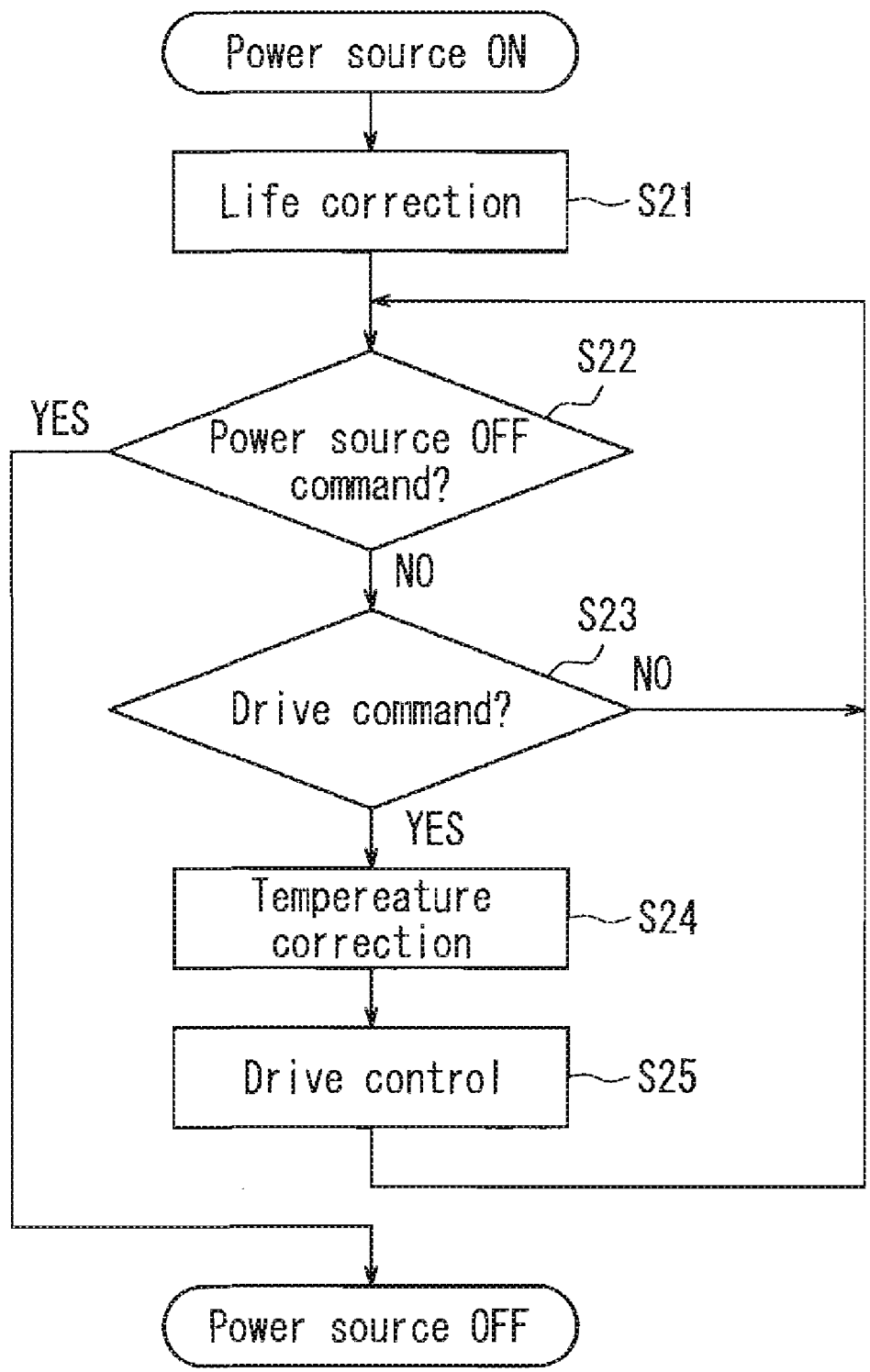
FIG. 9 is a flow chart showing an execution of a temperature correction and a life correction.

FIG. 9 shows a flow of processes of temperature correction and life correction. As shown in FIG. 9, at the power source switch 51, when an instruction of turning on the power source of the camera system 1 is inputted, a correction process based on the life correction value is executed first (S21), because wear of the ultrasonic motor 35 and the mechanical components coupled to the ultrasonic motor 35 does not occur abruptly during the use of the camera system 1 but little by little over time in use. Next, the operation of the power source switch 51 is monitored (S22), and when an instruction of turning off the power source of the camera system 1 is inputted, the power source of the camera system 1 is turned off to escape from the process. In contrast, when an instruction of turning off the power source of the camera system 1 is not inputted but the operation part (not shown) is operated by the photographer and various drive instructions are inputted (S23), a correction process based on the temperature correction value is executed (S24), because the environmental temperature of the ultrasonic motor 35 may change drastically depending on the drive condition or the use environment of the camera system 1. Next, the drive control is executed (S25) with reference to the drive instruction inputted in the step S23. After the drive control is finished, the process will return to S22 for monitoring the operation of the power source switch 51.

In the present embodiment, when the operation part (not shown) is operated by the photographer and the various drive instructions are inputted (S23), a correction process based on the temperature correction value is executed. However, the process is not necessarily executed every time the drive instruction is inputted. For example, it is possible to count the number of inputs of the drive instruction and to execute the correction process once for plural drive instructions (e.g., at every five instructions). It is also possible to execute the correction process once every several minutes regardless the drive instruction. This serves to decrease the time lag from the operation of the operation part by the photographer and input of various drive instructions until the start of the drive control of the lens by the ultrasonic motor, for the time required for the correction process based on the temperature correction value. As a result, the operation response can be improved.

During the calibration process, the rotation speed of the ultrasonic motor 35 is set to the median rotation speed. Thereby, even when the environmental temperature of the ultrasonic motor 35 varies, the ultrasonic motor 35 can be driven without fail within a drive frequency range established by the initial frequency characteristics, and thus detection of the drive frequency can be performed stably.

During the calibration process, the move distance of the focus lens 24 is set to correspond to two periods of the rotation unevenness (time 't1' in FIG. 6) of the ultrasonic motor 35 (step S1 in FIG. 5), and the detected variable are averaged. Thereby, even when a rotation unevenness occurs in the rotation speed of the detected ultrasonic motor 35 due to the loads of the drive system (such as the gear and the cam), it is possible to detect the drive frequency accurately to calculate the life correction value, and thus precise rotation control at the ultrasonic motor 35 can be maintained.

Furthermore, during the calibration process, the detected first and second drive frequencies are averaged (step S6 in FIG. 5). Thereby, even when there is a difference between the first drive frequency and the second drive frequency due to the orientation of the camera system 1, it is possible to detect the drive frequencies and to calculate the life correction value accurately, and thereby a precise rotation control at the ultrasonic motor 35 can be maintained.

Furthermore, during the calibration process, a target rotation speed of the ultrasonic motor 35 is set for a speed control (200 rpm in the present embodiment) and the drive frequency is measured at the time of reaching the target rotation speed feedback control). As a result, since the drive frequency can be measured directly according to this configuration, an accurate life correction value can be calculated, and a precise rotation control at the ultrasonic motor 35 can be maintained.

In the present embodiment, the correction control part 100 is configured independently from the lens microcomputer 20. However, when the correction control part 100 is incorporated in the lens microcomputer 20, the number of the chips can be decreased to reduce the cost and to provide a smaller interchangeable lens 2.

Furthermore, during the calibration process in the present embodiment, a target rotation speed of the ultrasonic motor 35 is set for a speed control (200 rpm in the present embodiment), and the drive frequency is measured at the time that the ultrasonic motor 35 reaches the target rotation speed feedback control). Alternatively, it is possible to fix the drive frequency of the ultrasonic motor 35 and to measure the rotation speed of the ultrasonic motor 35 at that time (open control).

In the present embodiment, as shown in FIG. 8, the frequency correction values are calculated based on the life variable Fv that is uniform across the rotation speed regions for the ultrasonic motor 35. Alternatively, the control can be performed by calculating the frequency correction value at a predetermined rotation speed and then by weighing the frequency correction value with a frequency correction value at another rotation speed. The life variable tends to increase as the rotation speed of the ultrasonic motor 35 is lowered, and it tends to decrease as the rotation speed of the ultrasonic motor 35 is raised. Therefore, by changing the frequency correction value calculated based on the life variable in accordance with the rotation speed, more accurate frequency correction value can be obtained. Specifically, weighing can be carried out by calculating a frequency correction value at a predetermined rotation speed of the ultrasonic motor 35, and subsequently multiplying the frequency correction value with a coefficient corresponding to plural rotation speed regions such that the frequency correction value is increased more for the lower rotation speed region while the frequency correction value is decreased more for the higher rotation speed region.

In the present embodiment, the calibration process is executed every time the camera system 1 is turned on, since the wear of the ultrasonic motor 35 and the mechanical components coupled thereto does not occur drastically during a use of the camera system 1 but the wear occurs gradually over time in use. Therefore, instead of executing the calibration process every time the camera system 1 is turned on, one calibration process can be executed after plural periods of turning on the camera system 1. With this configuration, the activation time of the camera system 1 can be shortened further when the calibration process is not executed. In contrast, the calibration process based on the environmental temperature of the ultrasonic motor 35 is executed every time right before driving the ultrasonic motor 35, since the environmental temperature of the ultrasonic motor 35 can change drastically depending on the drive condition and/or the use environment of the camera system 1.

Although the present embodiment refers to an example of a camera system 1 including an interchangeable lens 2 and a camera body 3 as separate components, similar effects can be obtained by using a camera formed by integrating an interchangeable lens and a camera body. In such a case, the correction control part 100 can be included in the camera body or within the microcomputer in the camera body.

The camera system 1 (system for attaching the interchangeable lens 2 detachably to the camera body 3) is an example of an image pickup system according to the present invention. Further, a camera formed by integrating a lens and a camera body (for example, a compact type digital camera) is an example of the image pickup apparatus according to the present invention. Furthermore, the interchangeable lens 2 in the present embodiment is an example of an interchangeable lens unit according to the present invention.

In the present embodiment, the correction control part 100 is provided at the interchangeable lens 2. Similar effects can be obtained even by replacing this to a configuration that the correction control part 100 is provided entirely or partially to the camera body 3.

Although the present embodiment refers to a digital single-lens reflex camera, similar effects can be obtained even by using other types of digital cameras such as a compact digital camera.

Although the present embodiment refers to a calibration process of an ultrasonic motor that drives a focus lens, the moving object to be driven with the ultrasonic motor is not limited to such a focus lens, but similar effects can be obtained by using other lenses.

In the present embodiment, an average value of the first drive frequency and the second drive frequency is calculated (step S6 in FIG. 5), and a differential process is performed from the thus calculated average value and a reference frequency so as to calculate a drive frequency variable (step S7 in FIG. 5). Similar effects can be obtained even by performing a differential process with reference to the first drive frequency and the reference frequency, performing a differential process with reference to the second drive frequency and the reference frequency, and calculating the average value of the two differences calculated in the differential processes.

The present invention can be applied preferably to an image pickup apparatus such as a digital still camera, an interchangeable lens unit, a camera body and an ultrasonic motor driving apparatus.

[Supplementary Note 1]

An image pickup apparatus of the present invention includes: a lens; an ultrasonic motor that moves the lens; a motor driving part that applies a periodically changing voltage to the ultrasonic motor, the voltage being applied for driving the ultrasonic motor; a storage part that stores as a reference frequency characteristic a relationship between a frequency of voltage applied by the motor driving part and a driving speed of the ultrasonic motor at the time of the voltage application; and a correction control part capable of executing a correction process. The correction process includes steps of: applying to the ultrasonic motor a specific or unspecific voltage by the motor driving part, measuring the relationship between the frequency of the applied voltage and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor at the time of the voltage application.

Accordingly, a precise control in the ultrasonic motor can be maintained even when the ultrasonic motor and the mechanical components such as a gear and a cam coupled to the ultrasonic motor are worn.

[Supplementary Note 2]

In the image pickup apparatus, the correction control part can be configured to execute the correction process at the time of turning on the image pickup apparatus. Accordingly, there is no necessity of storing the measurement data of the separately measured drive frequency in a memory such as a flash ROM. As a result, storage means can be omitted, and thus the configuration can be simplified. Therefore, the cost can be decreased and a smaller camera system 1 can be provided.

[Supplementary Note 3]

In the image pickup apparatus of the present invention, the correction control part can be configured to control the motor driving part so that during the correction process a specific or unspecific voltage is applied to the ultrasonic motor at the time of measuring the relationship between the frequency of the applied voltage and the driving speed of the ultrasonic motor, thereby the lens moving a round-trip within a predetermined range in an optical axis direction. Accordingly, the correction process at the correction control part can be finished in a short time, and thus the time for activating the image pickup apparatus can be shortened.

[Supplementary Note 4]

In the image pickup apparatus of the present invention, the correction control part can be configured to execute the correction process so as to measure the relationship between the frequency of the applied voltage and the driving speed of the ultrasonic motor during movement of the lens in a first direction, subsequently measures the relationship between the frequency of the applied voltage and the driving speed of the ultrasonic motor during movement of the lens in a second direction different from the first direction, and calculates the correction frequency characteristic by using a measurement result during the movement in the first direction and a measurement result during the movement in the second direction. Accordingly, the correction frequency characteristic can be calculated accurately even when the orientation of the image pickup apparatus varies, thereby maintaining the precise control at the ultrasonic motor.

[Supplementary Note 5]

In the image pickup apparatus of the present invention, the correction control part can be configured to control the motor driving part so that the ultrasonic motor operates at a driving speed as a substantial median of an operable maximum driving speed and an operable minimum driving speed at the time of operating the ultrasonic motor in the correction process. Accordingly, the ultrasonic motor can be driven without fail even when the environmental temperature of the ultrasonic motor varies, and the drive frequency can be detected stably.

[Supplementary Note 6]

In the image pickup apparatus of the present invention, the ultrasonic motor can be configured to vary the driving speed periodically, and the correction control part controls the motor driving part so that the predetermined range corresponds to a distance for moving the lens for a time period corresponding to multiples of a period of the variation in the driving speed.

[Supplementary Note 7]

In the image pickup apparatus of the present invention, it is possible that a temperature detection part capable of detecting environmental temperature of the ultrasonic motor is provided further, and that the correction control part is configured to adjust the correction frequency characteristic on the basis of a detection result from the temperature detection part at the time of measurement of the relationship between the frequency of the applied voltage and the driving speed of the ultrasonic motor. Accordingly, the influence of the environmental temperature at the time of the calibration process can be avoided. Therefore, it is possible to detect the drive frequency and to calculate the life variable accurately, and thus a precise control of the ultrasonic motor 35 can be maintained.

[Supplementary Note 8]

In the image pickup apparatus, the correction control part can be configured to adjust the correction frequency characteristic for every frequency of the applied voltage. Accordingly, the influence of the environmental temperature at the time of the calibration process can be avoided. Therefore, it is possible to detect the drive frequency and to calculate the life variable accurately, and thus a precise control of the ultrasonic motor 35 can be maintained.

[Supplementary Note 9]

In the image pickup apparatus of the present invention, the motor driving part can be configured to determine a voltage to be applied to the ultrasonic motor on the basis of the correction frequency characteristic and apply the thus determined voltage to the ultrasonic motor.

[Supplementary Note 10]

In the image pickup apparatus of the present invention, the motor driving part can be configured to determine a voltage to be applied to the ultrasonic motor on the basis of the correction frequency characteristic and the detection result from the temperature detection part, and apply the thus determined voltage to the ultrasonic motor.

[Supplementary Note 11]

In the image pickup apparatus of the present invention, the temperature detection part can be configured to detect temperature at the timing the ultrasonic motor drives the lens.

[Supplementary Note 12]

In the image pickup apparatus of the present invention, the temperature detection part can be configured to count the number that the ultrasonic motor drives the lens, and detect temperature once for a predetermined number of the drives.

[Supplementary Note 13]

In the image pickup apparatus of the present invention, the temperature detection part can be configured to detect temperature at a predetermined time period.

[Supplementary Note 14]

An interchangeable lens unit of the present invention includes: a lens; an ultrasonic motor that moves the lens; a motor driving part that applies a periodically changing voltage to the ultrasonic motor, the voltage being applied for driving the ultrasonic motor; a storage part that stores as a reference frequency characteristic a relationship between a frequency of voltage applied by the motor driving part and a driving speed of the ultrasonic motor at the time of the voltage application; and a correction control part capable of executing a correction process. The correction process includes steps of applying to the ultrasonic motor a specific or unspecific voltage by the motor driving part, measuring the relationship between the frequency of the applied voltage and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor at the time of the voltage application.

Accordingly, a precise control in the ultrasonic motor can be maintained even when the ultrasonic motor and the mechanical components such as a gear and a cam coupled to the ultrasonic motor are worn.

[Supplementary Note 15]

A camera body of the present invention is a camera body to which an interchangeable lens unit is attached detachably, the interchangeable lens unit comprising an ultrasonic motor that moves a lens and a motor driving part that applies a periodically changing voltage to the ultrasonic motor via a communication member, the voltage being applied for driving the ultrasonic motor, the communication member allows a communication between the camera body and the interchangeable lens unit, the camera body comprising: a storage part that stores as a reference frequency characteristic a relationship between a frequency of voltage applied by the motor driving part and a driving speed of the ultrasonic motor at the time of the voltage application; and a correction control part capable of executing a correction process. The correction process includes steps of: applying to the ultrasonic motor a specific or unspecific voltage by the motor driving part, measuring the relationship between the frequency of the applied voltage and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor at the time of the voltage application.

Accordingly, a precise control in the ultrasonic motor can be maintained even when the ultrasonic motor and the mechanical components such as a gear and a cam coupled to the ultrasonic motor are worn.

[Supplementary Note 16]

An ultrasonic motor driving apparatus of the present invention includes: an ultrasonic motor, a motor driving part that applies a periodically changing voltage to the ultrasonic motor, the voltage being applied for driving the ultrasonic motor, a storage part that stores as a reference frequency characteristic a relationship between a frequency of voltage applied by the motor driving part and a driving speed of the ultrasonic motor at the time of the voltage application; and a correction control part capable of executing a correction process. The correction process includes steps of: applying to the ultrasonic motor a specific or unspecific voltage by the motor driving part, measuring the relationship between the frequency of the applied voltage and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor at the time of the voltage application.

Accordingly, a precise control in the ultrasonic motor can be maintained even when the ultrasonic motor and the mechanical components such as a gear and a cam coupled to the ultrasonic motor are worn.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

What is claimed is:

1. An image pickup apparatus comprising:
a lens;
an ultrasonic motor that moves the lens;
a motor driving part that applies a periodically changing voltage to the ultrasonic motor, the voltage being applied for driving the ultrasonic motor;
a storage part that stores as a reference frequency characteristic a relationship between a frequency of voltage applied by the motor driving part and a driving speed of the ultrasonic motor at the time of the voltage application; and
a correction control part capable of executing a correction process,
the correction process including steps of: measuring the relationship between the frequency of the voltage applied by the motor driving part to the ultrasonic motor and the driving speed of the ultrasonic motor, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor,
wherein the correction control part controls the motor driving part so that during measuring the relationship between the frequency of the applied voltage and the driving speed of the ultrasonic motor, the lens moves round-trip within a predetermined range in an optical axis direction,
wherein the driving speed of the ultrasonic motor varies periodically, and the correction control part controls the motor driving part so that the predetermined range corresponds to a distance for moving the lens for a time period corresponding to multiples of a period of the variation in the driving speed.

2. The image pickup apparatus according to claim 1, wherein the correction control part executes the correction process at the time of turning on the image pickup apparatus.

3. The image pickup apparatus according to claim 1, wherein the correction control part executes the correction process so as to measure the relationship between the frequency of the applied voltage and the driving speed of the ultrasonic motor during movement of the lens in a first direction, subsequently measures the relationship between the frequency of the applied voltage and the driving speed of the ultrasonic motor during movement of the lens in a second direction different from the first direction, and calculates the correction frequency characteristic by using a measurement result during the movement in the first direction and a measurement result during the movement in the second direction.

4. The image pickup apparatus according to claim 1, further comprising a temperature detection part capable of detecting environmental temperature of the ultrasonic motor,
the correction control part adjusts the correction frequency characteristic on the basis of a detection result from the temperature detection part at the time of measurement of the relationship between the frequency of the applied voltage and the driving speed of the ultrasonic motor.

5. The image pickup apparatus according to claim 4, wherein the correction control part adjusts the correction frequency characteristic for every frequency of the applied voltage.

6. The image pickup apparatus according to claim 1, wherein the motor driving part determines a voltage to be applied to the ultrasonic motor on the basis of the correction frequency characteristic and applies the thus determined voltage to the ultrasonic motor.

7. The image pickup apparatus according to claim 4, wherein the motor driving part determines a voltage to be applied to the ultrasonic motor on the basis of the correction frequency characteristic and the detection result from the temperature detection part, and applies the thus determined voltage to the ultrasonic motor.

8. The image pickup apparatus according to claim 7, wherein the temperature detection part detects temperature at the timing the ultrasonic motor drives the lens.

9. The image pickup apparatus according to claim 7, wherein the temperature detection part counts the number that the ultrasonic motor drives the lens, and detects temperature once for a predetermined number of the drives.

10. The image pickup apparatus according to claim 7, wherein the temperature detection part detects temperature at a predetermined time period.

11. An interchangeable lens unit comprising:
a lens;
an ultrasonic motor that moves the lens;
a motor driving part that applies a periodically changing voltage to the ultrasonic motor, the voltage being applied for driving the ultrasonic motor;
a storage part that stores as a reference frequency characteristic a relationship between a frequency of voltage applied by the motor driving part and a driving speed of the ultrasonic motor at the time of the voltage application; and
a correction control part capable of executing a correction process,
the correction process including steps of: measuring the relationship between the frequency of the voltage applied by the motor driving part to the ultrasonic motor and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor,
wherein the correction control part controls the motor driving part so that during measuring the relationship between the frequency of the applied voltage and the driving speed of the ultrasonic motor, the lens moves round-trip within a predetermined range in an optical axis direction, and
wherein the driving speed of the ultrasonic motor varies periodically, and the correction control part controls the motor driving part so that the predetermined range corresponds to a distance for moving the lens for a time period corresponding to multiples of a period of the variation in the driving speed.

12. A camera body to which an interchangeable lens unit is attached detachably; the interchangeable lens unit comprising an ultrasonic motor that moves a lens, and a motor driving part that applies a periodically changing voltage to the ultrasonic motor via a communication member, the voltage being applied for driving the ultrasonic motor,
the communication member allows a communication between the camera body and the interchangeable lens unit,
the camera body comprising:
a storage part that stores as a reference frequency characteristic a relationship between a frequency of voltage applied by the motor driving part and a driving speed of the ultrasonic motor at the time of the voltage application; and
a correction control part capable of executing a correction process,
the correction process including steps of: measuring the relationship between the frequency of the voltage applied by the motor driving part to the ultrasonic motor and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor,
wherein the correction control part controls the motor driving part so that during measuring the relationship between the frequency of the applied voltage and the driving speed of the ultrasonic motor, the lens moves round-trip within a predetermined range in an optical axis direction, and
wherein the driving speed of the ultrasonic motor varies periodically, and the correction control part controls the motor driving part so that the predetermined range corresponds to a distance for moving the lens for a time period corresponding to multiples of a period of the variation in the driving speed.

13. An ultrasonic motor driving apparatus comprising:
an ultrasonic motor,
a motor driving part that applies a periodically changing voltage to the ultrasonic motor, the voltage being applied for driving the ultrasonic motor,
a storage part that stores as a reference frequency characteristic a relationship between a frequency of voltage applied by the motor driving part and a driving speed of the ultrasonic motor at the time of the voltage application; and
a correction control part capable of executing a correction process,
the correction process including steps of: measuring the relationship between the frequency of the voltage applied by the motor driving part to the ultrasonic motor and the driving speed of the ultrasonic motor at the time of the voltage application, correcting the reference frequency characteristic on the basis of the correlation between the measured relationship and the reference frequency characteristic, and calculating a correction frequency characteristic that exhibits an updated relationship between the frequency of the voltage applied by the motor driving part and the driving speed of the ultrasonic motor,
wherein the correction control part controls the motor driving part so that during measuring the relationship between the frequency of the applied voltage and the driving speed of the ultrasonic motor, the lens moves round-trip within a predetermined range in an optical axis direction, and
wherein the driving speed of the ultrasonic motor varies periodically, and the correction control part controls the motor driving part so that the predetermined range corresponds to a distance for moving the lens for a time period corresponding to multiples of a period of the variation in the driving speed.

14. The image pickup apparatus according to claim 1, wherein the correction control part controls the motor driving part so that the ultrasonic motor operates at a driving speed as a median of an operable maximum driving speed and an operable minimum driving speed at the time of operating the ultrasonic motor in the correction process.

15. The interchangeable lens unit according to claim 11, wherein the correction control part controls the motor driving part so that the ultrasonic motor operates at a driving speed as a median of an operable maximum driving speed and an operable minimum driving speed at the time of operating the ultrasonic motor in the correction process.

16. The camera body according to claim 12, wherein the correction control part controls the motor driving part so that the ultrasonic motor operates at a driving speed as a median of an operable maximum driving speed and an operable minimum driving speed at the time of operating the ultrasonic motor in the correction process.

17. The ultrasonic motor driving apparatus according to claim 13, wherein the correction control part controls the motor driving part so that the ultrasonic motor operates at a driving speed as a median of an operable maximum driving speed and an operable minimum driving speed at the time of operating the ultrasonic motor in the correction process.

* * * * *

UNITED STATES PATENT AND TRADEMARK OFFICE
CERTIFICATE OF CORRECTION

PATENT NO. : 8,228,389 B2
APPLICATION NO. : 12/338216
DATED : July 24, 2012
INVENTOR(S) : Kawazoe et al.

It is certified that error appears in the above-identified patent and that said Letters Patent is hereby corrected as shown below:

Face Page, Field "56", column 2, under "Foreign Patent Documents", line 3, delete "02004205742" and insert --2004-205742--.

Signed and Sealed this
Fourth Day of December, 2012

David J. Kappos
*Director of the United States Patent and Trademark Office*